(No Model.)

A. SANFORD.
FERRULE FOR CANT HOOKS AND THE LIKE.

No. 366,689. Patented July 19, 1887.

Witnesses.
Chas. R. Burr
A. J. Stewart

Inventor.
Albert Sanford
by Church & Church
his Attorneys.

N. PETERS, Photo-Lithographer, Washington, D. C.

UNITED STATES PATENT OFFICE.

ALBERT SANFORD, OF OSHKOSH, WISCONSIN.

FERRULE FOR CANT-HOOKS AND THE LIKE.

SPECIFICATION forming part of Letters Patent No. 366,689, dated July 19, 1887.

Application filed March 26, 1887. Serial No. 232,593. (No model.)

*To all whom it may concern:*

Be it known that I, ALBERT SANFORD, of Oshkosh, in the county of Winnebago and State of Wisconsin, have invented certain new and useful Improvements in Ferrules for Cant-Hooks and the Like; and I do hereby declare the following to be a full, clear, and exact description of the same, reference being had to the accompanying drawings, forming a part of this specification, and to the figures and letters of reference marked thereon.

My present invention has for its object to improve the construction of ferrules or toe-rings for peavies, pike-poles, cant-hooks, and analogous tools and implements—such, for instance, as is shown in my prior Patents Nos. 220,093 and 228,943, dated, respectively, September 30, 1879, and June 15, 1880; and the said invention consists in certain details of construction and arrangements of parts to be hereinafter described, and pointed out particularly in the claims at the end of this specification.

Figure 1:
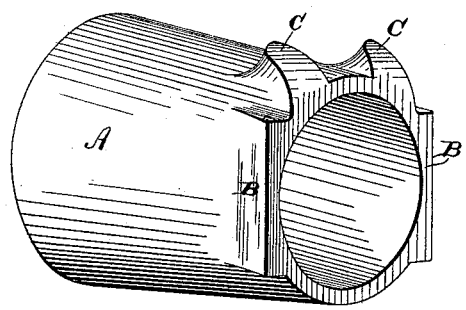
Figure 2:
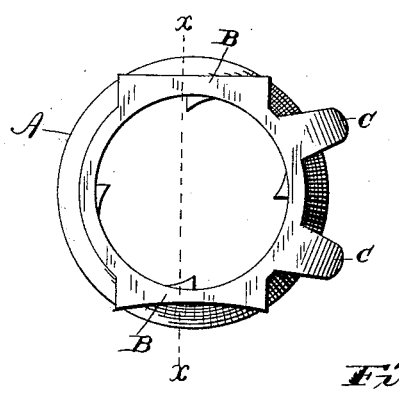
Figure 3:
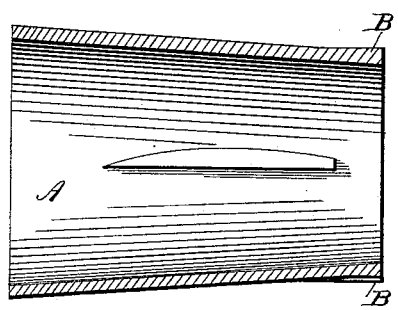
Figure 4:
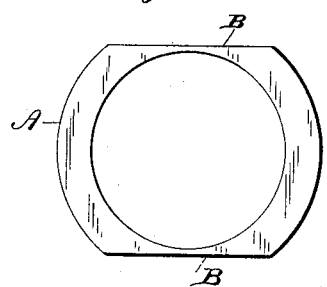

In the accompanying drawings, Figure 1 represents a ferrule or toe-ring embodying my invention, constructed especially for application to a cant-hook. Fig. 2 is an end view of the same. Fig. 3 is a sectional view taken on the line *x x*, Fig. 2. Fig. 4 represents a modification.

Similar letters of reference indicate the same parts.

Heretofore these ferrules or toe-rings have been made perfectly plain, tapering gradually from one end to the other, or else have had projections or lugs formed on them designed to co-operate with a cant-hook in turning logs. The lugs or projections referred to may be made of any desired shape; but I prefer the form shown in my before-mentioned Patent No. 228,943—that is to say, with their surfaces next the end of the ferrule beveled back, so as to allow the implement when resting on them to move forward end on, and to ride over such slight obstructions as may be met with on the floor, as well as to form sharp edges for engaging the log when co-operating with the hook.

In practice it is often found desirable to use the staff on which the ferrule is located as a lever for prying and moving logs, &c., and when used in this way it is found that the round surface of the ferrule affords a very inadequate support upon which to fulcrum a lever, as well on account of its liability to slip away from the operator and turn sidewise as its liability to be bent or broken. I overcome these difficulties by constructing the ferrule A with a substantially straight edge or surface, B, on one or both sides thereof, slightly raised above the general surface and preferably forming a comparatively sharp or chisel edge. (Shown clearly in Fig. 3.)

As shown in the drawings, the ferrule is designed especially for use in connection with a cant-hook, the projections or lugs C adapted for co-operation with the hook and the straight bearing-edges B being located one on either side, as a cant-hook can be used advantageously as a lever only when on its side.

It is obvious that the straight edge B may be slightly concave, as shown on the lower side of the ferrule in Fig. 2.

In the modification shown in Fig. 4 the body of the ferrule is made thick and the straight edges formed by cutting away a portion of the outer surface at the lower end of the ferrule.

I do not wish to be limited to the exact construction shown in the drawings, as it is obvious that the straight edges or bearing-surfaces may be employed upon any ferrule adapted for application to any class of implements used as levers; but

What I claim as new, and desire to secure by Letters Patent, is—

1. As a new article of manufacture, a ferrule for peavies, pike-poles, cant-hooks, and analogous implements having one or more relatively long and substantially straight edges or surfaces on its outer circumference and in line with the plane of the end of the ferrule, whereby a long bearing is afforded and the slipping and turning of the implement prevented when resting on said edge, substantially as described.

2. As a new article of manufacture, a ferrule for peavies, pike-poles, cant-hooks, and analogous implements, provided on its outer circumference and at or near its lower end with one or more substantially straight edges or surfaces and one or more lugs inclined or beveled for facilitating the movement of the implement over the floor or other surface, end on, said lugs being located opposite to or to one side of the said straight edges or surfaces, substantially as and for the purposes specified.

3. As a new article of manufacture, a ferrule for cant-hooks, having a lug or lugs thereon for co-operating with the hook, and one or more substantially straight edges or surfaces at the side, substantially as described.

ALBERT SANFORD.

Witnesses:
C. R. NEVITT, Jr.,
FRANK BELL.